US011494971B2

(12) United States Patent
Ito

(10) Patent No.: US 11,494,971 B2
(45) Date of Patent: Nov. 8, 2022

(54) MATERIAL GENERATION APPARATUS, IMAGE GENERATION APPARATUS, AND IMAGE PROCESSING APPARATUS

(71) Applicant: CANON KABUSHIKI KAISHA, Tokyo (JP)

(72) Inventor: Hironao Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 16/781,559

(22) Filed: Feb. 4, 2020

(65) Prior Publication Data

US 2020/0258288 A1 Aug. 13, 2020

(30) Foreign Application Priority Data

Feb. 12, 2019 (JP) .............................. JP2019-022873

(51) Int. Cl.
| | | |
|---|---|---|
| G06T 15/08 | (2011.01) | |
| G06T 7/194 | (2017.01) | |
| H04N 5/222 | (2006.01) | |
| G06T 7/11 | (2017.01) | |
| H04N 5/232 | (2006.01) | |
| G06T 7/174 | (2017.01) | |

(52) U.S. Cl.
CPC ............... *G06T 15/08* (2013.01); *G06T 7/11* (2017.01); *G06T 7/174* (2017.01); *G06T 7/194* (2017.01); *H04N 5/2226* (2013.01); *H04N 5/23229* (2013.01)

(58) Field of Classification Search
CPC .. H04N 5/2226; H04N 5/23229; H04N 5/247;
G01B 11/245; G01C 11/02; G06T 7/11;
G06T 7/174; G06T 7/194; G06T 7/254;
G06T 7/564; G06T 15/08; G06T 17/00;
G06T 2207/10016
See application file for complete search history.

(56) References Cited

U.S. PATENT DOCUMENTS

2002/0122117 A1* 9/2002 Nakagawa ......... H04N 5/23238
348/241
2004/0109009 A1* 6/2004 Yonezawa ............. G06T 19/006
345/632

(Continued)

FOREIGN PATENT DOCUMENTS

| JP | 2005-065051 A | 3/2005 |
| JP | 2008-217593 A | 9/2008 |
| JP | 2017-211828 A | 11/2017 |

OTHER PUBLICATIONS

Chang et al. "Virtual-view-based stereo video composition." 2013 Asia-Pacific Signal and Information Processing Association Annual Summit and Conference. IEEE, 2013. (Year: 2013).*

(Continued)

*Primary Examiner* — Katrina R Fujita
(74) *Attorney, Agent, or Firm* — Canon U.S.A., Inc. IP Division

(57) ABSTRACT

A material generation apparatus includes an acquisition unit configured to acquire a plurality of camera images, and a material data generation unit configured to generate, based on a camera image selected from among the camera images, at least one of a foreground image and a background image as material data to be used for generation of an image corresponding to a designated viewpoint.

13 Claims, 13 Drawing Sheets

(56) References Cited

U.S. PATENT DOCUMENTS

| | | | |
|---|---|---|---|
| 2007/0122027 A1* | 5/2007 | Kunita | G06T 7/593 382/154 |
| 2008/0048848 A1* | 2/2008 | Kawakami | H04N 5/2224 348/E7.086 |
| 2009/0079728 A1* | 3/2009 | Sugita | G06T 15/20 345/418 |
| 2009/0128568 A1* | 5/2009 | Gloudemans | G06V 10/273 345/474 |
| 2009/0315978 A1* | 12/2009 | Wurmlin | G06T 5/005 348/E13.001 |
| 2011/0242278 A1* | 10/2011 | Yang | H04N 13/178 348/E13.064 |
| 2011/0254927 A1* | 10/2011 | Yahata | H04N 13/111 348/46 |
| 2011/0254973 A1* | 10/2011 | Nishiyama | H04N 5/247 348/222.1 |
| 2012/0057852 A1* | 3/2012 | Devleeschouwer | H04N 5/262 386/278 |
| 2014/0293028 A1* | 10/2014 | Nguyen | H04N 13/305 348/59 |
| 2016/0171335 A1* | 6/2016 | Aguilera Perez | G06K 9/36 382/285 |
| 2018/0063514 A1* | 3/2018 | Mizuno | H04N 5/247 |
| 2018/0174331 A1* | 6/2018 | Pham | G06T 7/55 |
| 2018/0204381 A1* | 7/2018 | Kanatsu | G06T 19/003 |
| 2018/0232943 A1* | 8/2018 | Shikata | H04N 21/6587 |
| 2018/0330163 A1* | 11/2018 | Matsuzaki | G06V 10/993 |
| 2018/0332218 A1* | 11/2018 | Yoshimura | H04N 5/247 |
| 2019/0022492 A1* | 1/2019 | Takahashi | G06T 19/006 |
| 2019/0098278 A1* | 3/2019 | Koizumi | H04N 13/243 |
| 2019/0221029 A1* | 7/2019 | Yoneda | H04N 5/2224 |
| 2019/0259173 A1* | 8/2019 | Yoshimura | G06V 40/103 |
| 2019/0266786 A1* | 8/2019 | Kobayashi | H04N 13/00 |
| 2019/0356906 A1* | 11/2019 | Handa | G06T 15/205 |
| 2020/0322591 A1* | 10/2020 | Yano | G06T 7/194 |
| 2021/0134058 A1* | 5/2021 | Ito | H04N 13/111 |

OTHER PUBLICATIONS

Sankoh et al. "Robust foreground segmentation from sparsely arranged multi-view cameras." 2013 IEEE 15th International Workshop on Multimedia Signal Processing (MMSP). IEEE, 2013. (Year: 2013).*

* cited by examiner

FIG.9

| TAG NAME | Field Name | TYPE | COUNT |
|---|---|---|---|
| PUC TAG VERSION | PUC Version ID | BYTE | 4 |
| ORIENTATION PARAMETER | Rotation Quaternion | SLONG | 4 |
| LOCATION PARAMETER | Translation Vector | FLOAT | 3 |
| ANGLE OF VIEW PARAMETER | Horizontal Angle | FLOAT | 1 |
| DISTANCE TO IMAGE-CAPTURING TARGET | Distance to Target | LONG | 1 |
| FOCAL LENGTH | Focal Length | RATIONAL | 1 |
| IMAGE WIDTH | Image Width | LONG | 1 |
| IMAGE LENGTH | Image Length | LONG | 1 |
| APERTURE VALUE | Aperture Value | RATIONAL | 1 |
| SHUTTER SPEED | Shutter Speed Value | SRATIONAL | 1 |
| ISO SPEED RATE | ISO Speed Ratings | SHORT | 1 |

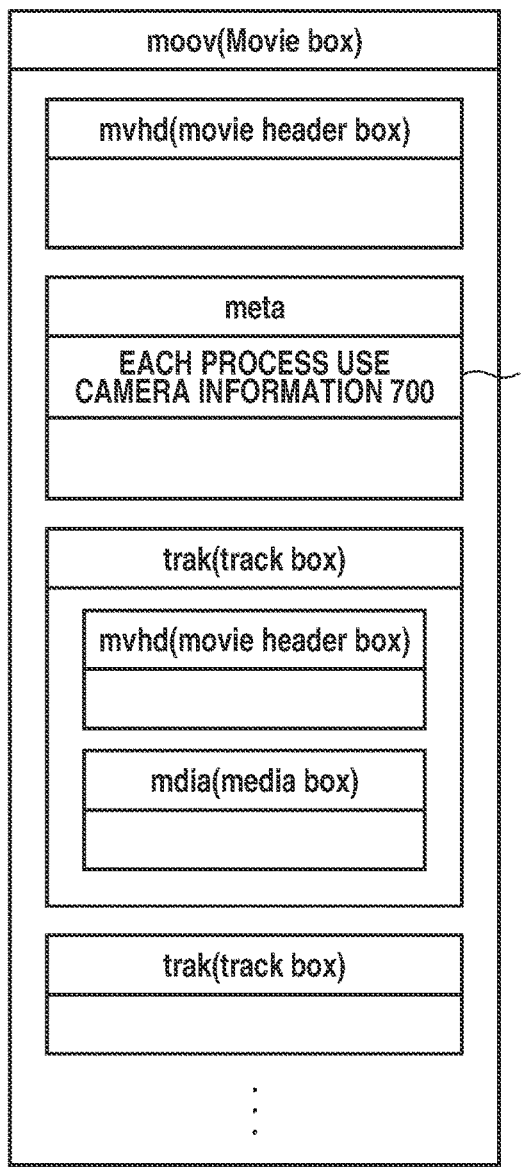
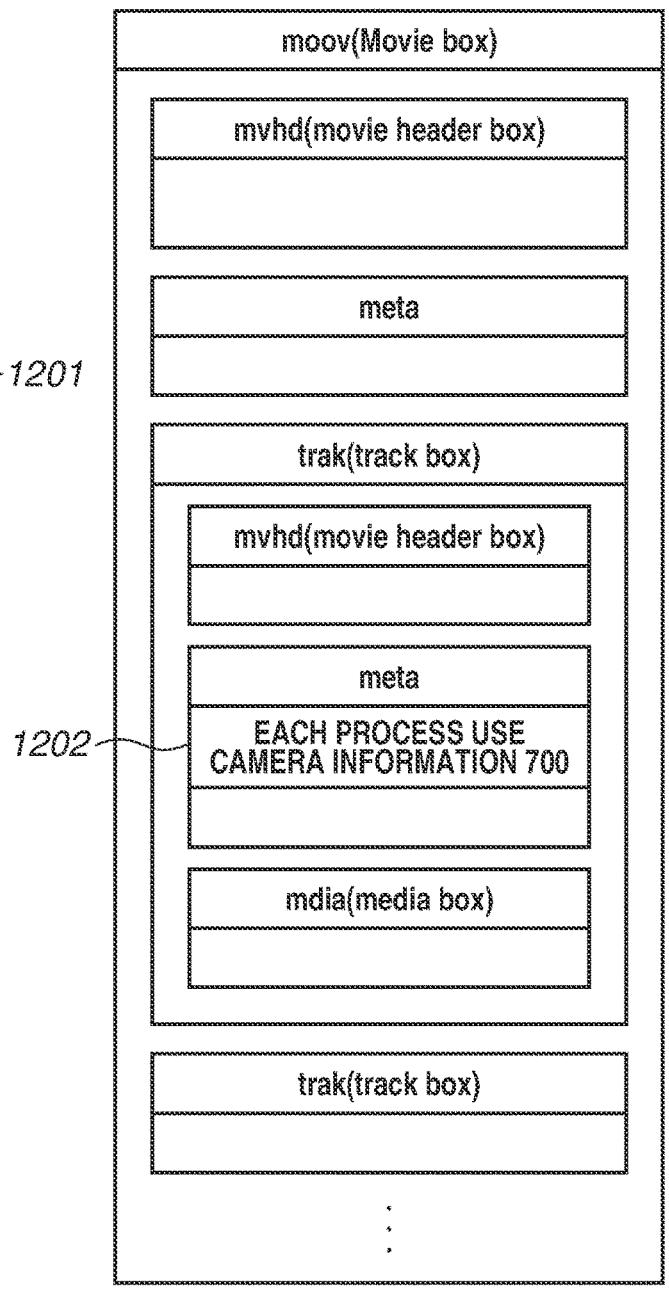

MATERIAL GENERATION APPARATUS, IMAGE GENERATION APPARATUS, AND IMAGE PROCESSING APPARATUS

BACKGROUND

Field

The present disclosure relates to a material generation apparatus, an image generation apparatus, an image processing apparatus, a material generation method, an image generation method, an image processing method, and a storage medium.

Description of the Related Art

There has been discussed an apparatus that generates a virtual viewpoint image viewed from a virtual viewpoint designated by a user, from images captured by a plurality of cameras included in an image-capturing system.

An image processing system discussed in Japanese Patent Application Laid-Open No. 2017-211828 generates a foreground image, a background image, and three-dimensional shape data, from images captured by a plurality of cameras. The foreground image, the background image, and the three-dimensional shape data are material data for generating a virtual viewpoint image. The image processing system acquires the material data based on a virtual viewpoint designated by a user, and reproduces the virtual viewpoint image based on the acquired material data.

It is desirable to improve the image quality of the foreground image and the accuracy of the three-dimensional shape data to improve the image quality of the virtual viewpoint image. To do so, an increase in camera resolution and an increase in the number of cameras are needed. However, there is such an issue that the increase in the camera resolution and the increase in the number of cameras lead to an increase in processing load for generation of the material data such as the foreground image and the three-dimensional shape data.

SUMMARY

The present disclosure is directed to generating material data appropriately, while avoiding an increase in processing load.

According to an aspect of the present disclosure, a material generation apparatus includes an acquisition unit configured to acquire images captured by a plurality of image capturing apparatuses, and a material data generation unit configured to generate, based on an image selected from among the images acquired by the acquisition unit, at least one of a foreground image and a background image as material data to be used for generation of an image corresponding to a designated viewpoint.

Further features of the present disclosure will become apparent from the following description of exemplary embodiments with reference to the attached drawings.

BRIEF DESCRIPTION OF THE DRAWINGS

FIG. 9 is a diagram illustrating an example of tag information of the each process use camera information.

FIGS. 12A and 12B each illustrate an example of addition of the each process use camera information to a movie box.

DESCRIPTION OF THE EMBODIMENTS

Exemplary embodiments according to the present disclosure will be described below with reference to the drawings.

A material generation apparatus 10 according to a first exemplary embodiment will be described. The material generation apparatus 10 generates a foreground image, a background image, and three-dimensional shape data (hereinafter referred to as "3D model") to be material data for a virtual viewpoint image, using camera images acquired from a plurality of cameras.

In general, a 3D model of higher accuracy can be generated by using camera images of many cameras to generate a 3D model. Meanwhile, if all the camera images of many cameras are stored, data to be stored is increased, so that a disk access bandwidth becomes large. The material generation apparatus 10 according to the present exemplary embodiment reduces data to be stored, by selecting cameras for capturing a foreground image and a background image to be stored as the material data from among the plurality of cameras, while generating a 3D model with high accuracy using camera images from all the cameras.

Figure 1:
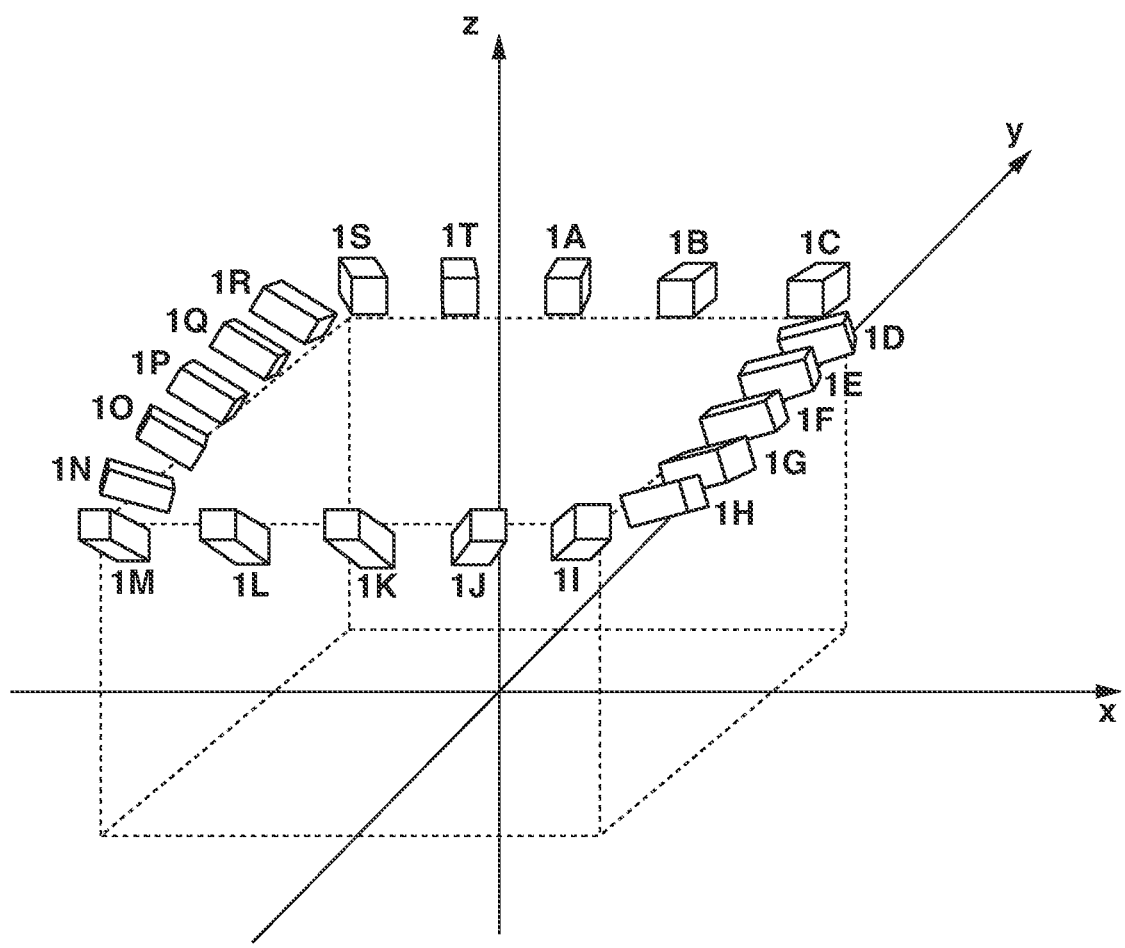
FIG. 1 is a diagram illustrating an example of an overview of an image-capturing system.

FIG. 1 is a diagram illustrating an example of an overview of an image-capturing system including a plurality of cameras.

In the image-capturing system, a plurality of cameras 1A to 1T captures images of a target space to generate material data for a virtual viewpoint image. Here, the plurality of cameras 1A to 1T is disposed in an oval shape to surround the target space. However, the number of the cameras and the arrangement of the cameras are not limited thereto. The image captured by each of the cameras 1A to 1T is input to the material generation apparatus 10. Camera-related information about each camera, such as an orientation of a camera, a position of a camera, an angle of view of a camera, a distance to an image-capturing target, a focal length, an image width, an image length, an aperture value, a shutter speed, and an International Organization for Standardization (ISO) sensitivity, in the image-capturing system is set in the material generation apparatus 10 beforehand.

Figure 2:
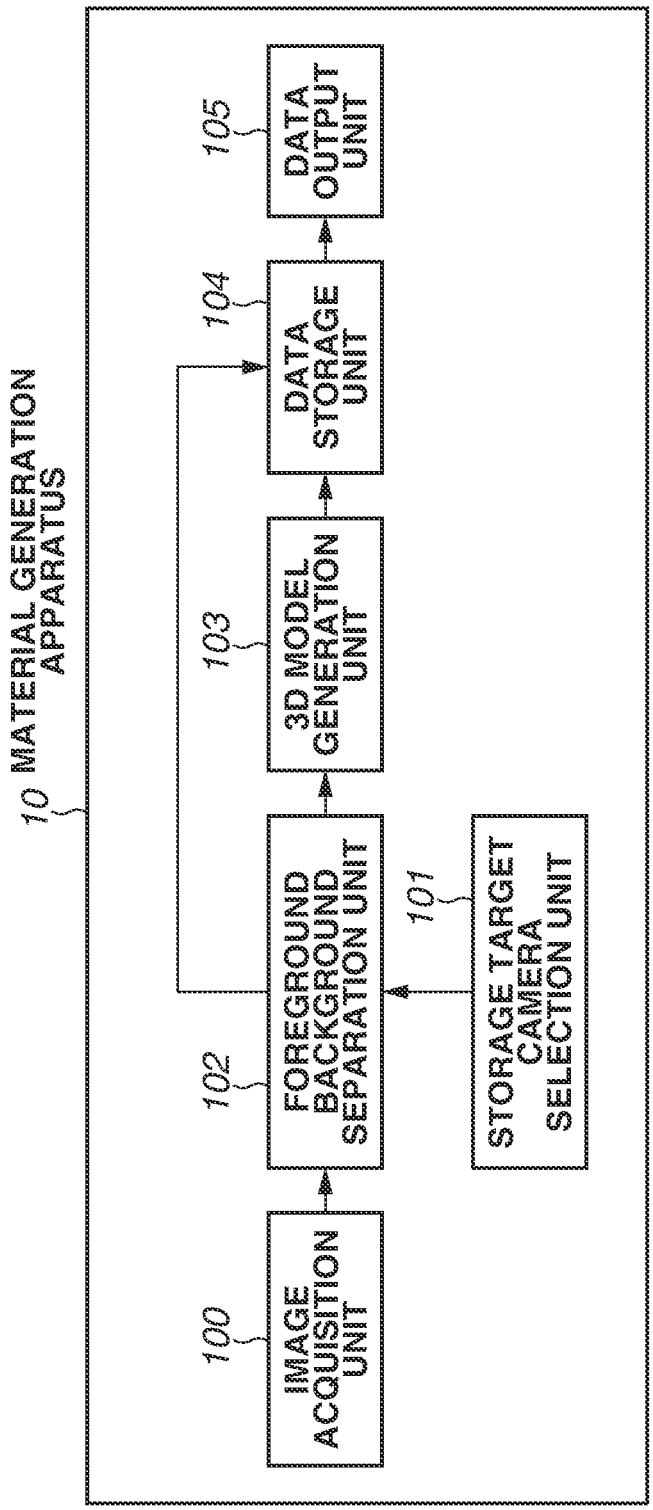
FIG. 2 is a diagram illustrating an example of a configuration of a material generation apparatus according to one or more aspects of the present disclosure.

FIG. 2 is a diagram illustrating an example of a configuration of the material generation apparatus 10. The configuration illustrated in FIG. 2 is implemented by a central processing unit (CPU) of the material generation apparatus 10 when the CPU executes a program stored in a nonvolatile memory.

The material generation apparatus 10 has an image acquisition unit 100, a storage target camera selection unit 101, a foreground background separation unit 102, a 3D model generation unit 103, a data storage unit 104, and a data output unit 105.

The image acquisition unit 100 acquires a camera image from each of the cameras. The image acquisition unit 100 outputs the acquired camera image to the foreground background separation unit 102.

The storage target camera selection unit 101 selects a camera for capturing the foreground image to be stored as the material data and a camera for capturing the background to be stored as the material data, based on the camera-related information set beforehand. In the present exemplary embodiment, the camera for capturing the foreground image to be stored as the material data will be referred to as "foreground storage target camera", and the camera for capturing the background image to be stored as the material data will be referred to as "background storage target camera".

The storage target camera selection unit 101 outputs identification information of the foreground storage target camera and identification information of the background storage target camera to the foreground background separation unit 102. The identification information is information for uniquely identifying a camera, and, for example, a camera identification (ID) in the image-capturing system can be used as the identification information.

Here, a method for selection of a camera by the storage target camera selection unit 101 will be described.

In a case where a plurality of cameras is disposed on the circumference of an oval to capture images of a target space in the image-capturing system according to the present exemplary embodiment, the storage target camera selection unit 101 does not select cameras having close positions and directions (orientations) to each other from among the plurality of cameras. Specifically, in a case where the foreground storage target cameras are to be selected from the cameras arranged in the manner illustrated in FIG. 1, desirably, the storage target camera selection unit 101 selects every other camera (or one for every two or more cameras), for example, the cameras 1A, 1C, 1E, and so on, based on the positions of the cameras, and does not select adjacent cameras. Further, in the case where the foreground storage target cameras are to be selected, the storage target camera selection unit 101 may select cameras varying in focal length or cameras varying in resolution.

In a case where the background storage target cameras are to be selected, consistency of color and luminance is important for the background and therefore, the storage target camera selection unit 101 selects a camera having a short focal length and capable of capturing an image of a region as wide as possible in the target space. Specifically, in a case where the background storage target cameras are to be selected from the cameras illustrated in FIG. 1, it is desirable to select a camera disposed at each of the four corners, i.e., the cameras 1C, 1I, 1M, and 1S. These four cameras each have a short focal length and a long distance to the image-capturing target, and thus are appropriate for capturing the background images. Therefore, a camera having a shorter focal length than that of the foreground storage target camera or a camera having a longer distance to the center of the image-capturing target than that of the foreground storage target camera is selected as the background storage target camera.

It is desirable that the storage target camera selection unit 101 select a camera based on the camera-related information, but the selection method is not limited to such a method. For example, the storage target camera selection unit 101 may select a camera, based on at least one of pieces of information including lens resolution, small aberration, information about lens performance such as color reproducibility, and sensor information indicating whether the camera has high sensitivity.

For example, in a case where there is no large difference in position between cameras, the storage target camera selection unit 101 can select a camera having a higher level of lens performance, such as resolution and aberration, by comparing the cameras in terms of lens performance. Further, a rectangular solid virtually placed in the target space may be projected on a camera image based on three-dimensional calculation, and a camera may be selected based on information such as the degree of overlap between the image-capturing regions of the respective cameras.

The foreground background separation unit 102 separates a foreground and a background based on the camera image output from the image acquisition unit 100.

Specifically, the foreground background separation unit 102 generates the background image, using a plurality of frames in all the camera images. For example, the foreground background separation unit 102 detects a region where a motion is present and a region where no motion is present by comparing the images of the plurality of frames and updates the background image using only the region where no motion is present, thereby generating the latest background image thereby.

Further, for all the cameras, the foreground background separation unit 102 compares a camera image output from each of the cameras and the background image generated from the camera image, and thereby determines a pixel having a value more than or equal to a threshold set beforehand to be a foreground pixel. The foreground background separation unit 102 generates a binary foreground silhouette image indicating whether the region is a foreground region based on the foreground pixel, and outputs the generated foreground silhouette image to the 3D model generation unit 103. The size of the foreground silhouette image is identical to the size of the image output from the camera.

Furthermore, the foreground background separation unit 102 acquires the identification information of the foreground storage target camera selected by the storage target camera selection unit 101, and outputs the foreground image generated from the camera image of the foreground storage target camera to the data storage unit 104. The data storage unit 104 stores the foreground image output from the foreground background separation unit 102. Here, the foreground image is an image group obtained by clipping the foreground region having a rectangular shape, in which a series of foreground pixels is connected, based on the generated foreground silhouette image.

The foreground background separation unit 102 also acquires the identification information of the background storage target camera selected by the storage target camera selection unit 101, and outputs the background image generated from the camera image of the background storage target camera to the data storage unit 104. The data storage unit 104 stores the background image output from the foreground background separation unit 102.

The 3D model generation unit 103 generates a 3D model based on the foreground silhouette image output from the foreground background separation unit 102. In the present exemplary embodiment, the 3D model generation unit 103 generates the 3D model using a volume intersection method (shape from silhouette method). In the volume intersection method, rectangular solids each having a fixed size are lined in a 3D-model generation target space, and each of the rectangular solids is three-dimensionally projected on the foreground silhouette image of each of the cameras, to determine whether the projected rectangular solid overlaps the foreground pixel. The processing for determining an overlap with the foreground pixel and determining whether the rectangular solid is a rectangular solid for forming the 3D model is repeated to generate the 3D model.

For example, in a case where the 3D model generation unit 103 determines that a certain rectangular solid is a rectangular solid for forming the 3D model in all the cameras, the 3D model generation unit 103 keeps the rectangular solid as a rectangular solid for forming the 3D model. The 3D model generation unit 103 performs the determination for all the rectangular solids, and keeps a rectangular solid for building the 3D model in the generation target space. Further, the 3D model generation unit 103 outputs point group data for building the 3D model indicated by pieces of coordinate information of the rectangular solids to the data storage unit 104. Furthermore, the 3D model generation unit 103 outputs the foreground silhouette image to the data storage unit 104. The data storage unit 104 stores the point group data and the foreground silhouette image. Alternatively, the 3D model generation unit 103 may output an element such as a region or voxel, in place of the point group data.

The data output unit 105 acquires necessary data from the data storage unit 104 in response to a request of an external apparatus and outputs the acquired information. Here, the request of the external apparatus is an output request with respect to the foreground image, data such as the 3D model, and time information associated with the data, which are stored in the data storage unit 104. The time information includes the time at which the camera image based on which the data is generated is captured.

Figure 13:
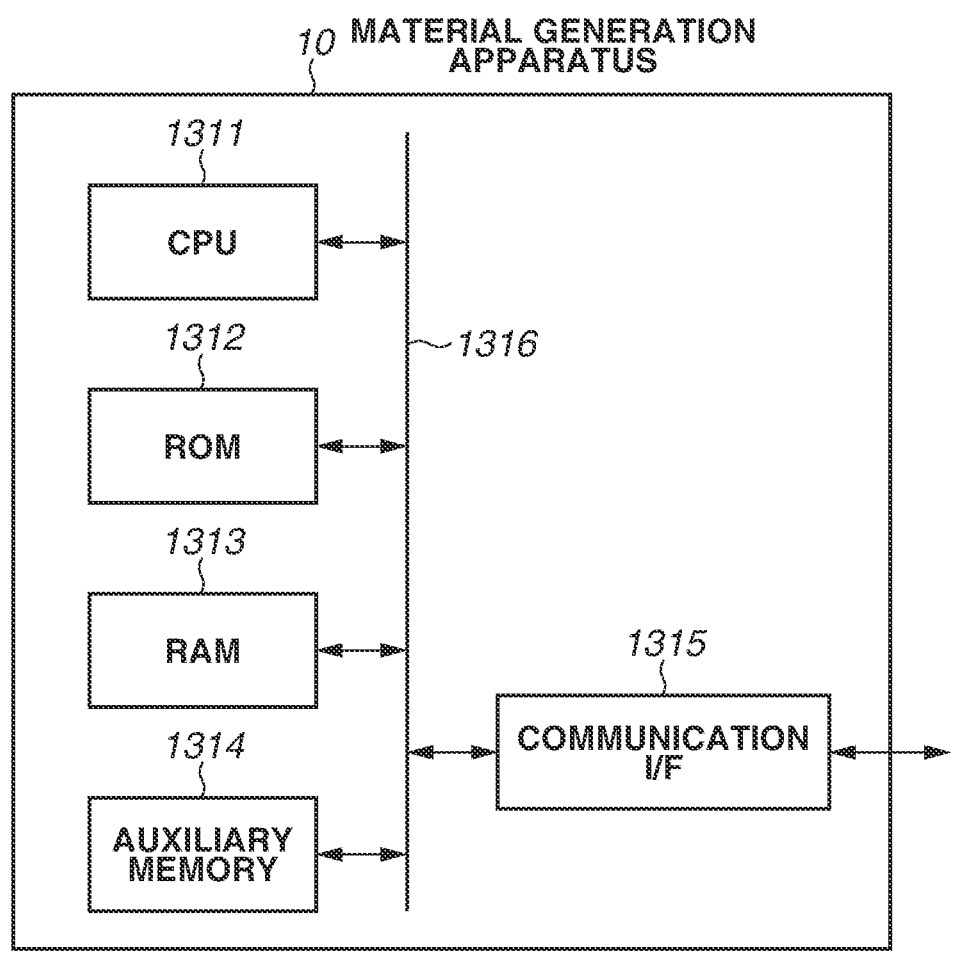
FIG. 13 is a block diagram illustrating an example of a hardware configuration of the material generation apparatus according to one or more aspects of the present disclosure.

Next, a hardware configuration of the material generation apparatus 10 will be described with reference to FIG. 13. An image processing apparatus and an image generation apparatus to be described below each also have a hardware configuration similar to the configuration of the material generation apparatus 10 to be described below.

The material generation apparatus 10 has a CPU 1311, a read only memory (ROM) 1312, a random access memory (RAM) 1313, an auxiliary memory 1314, a communication interface (IIF) 1315, and a bus 1316.

The CPU 1311 implements each function of the material generation apparatus 10 illustrated in FIG. 2 by controlling the entire material generation apparatus 10 using a computer program and data stored in the ROM 1312 and the RAM 1313. The material generation apparatus 10 may have one or a plurality of pieces of dedicated hardware different from the CPU 1311, and the dedicated hardware may execute at least a part of processing to be executed by the CPU 1311. Examples of the dedicated hardware include an application specific integrated circuit (ASIC), a field programmable gate array (FPGA), and a digital signal processor (DSP).

The ROM 1312 stores a program such as a program requiring no change. The RAM 1313 temporarily stores a program and data supplied from the auxiliary memory 1314, and data supplied from outside via the communication I/F 1315. The auxiliary memory 1314 is configured of, for example, a device such as a hard disk drive, and stores various data such as image data and audio data.

The communication I/F 1315 is used for communication with an external apparatus outside the material generation apparatus 10. For example, in a case where the material generation apparatus 10 is connected to the external apparatus by wire, a cable for communication is connected to the communication I/F 1315. In a case where the material generation apparatus 10 has a wireless communication function for communication with the external apparatus, the communication I/F 1315 includes an antenna. The bus 1316 connects each portion of the material generation apparatus 10 to each other and thereby transmits information.

Figure 3:
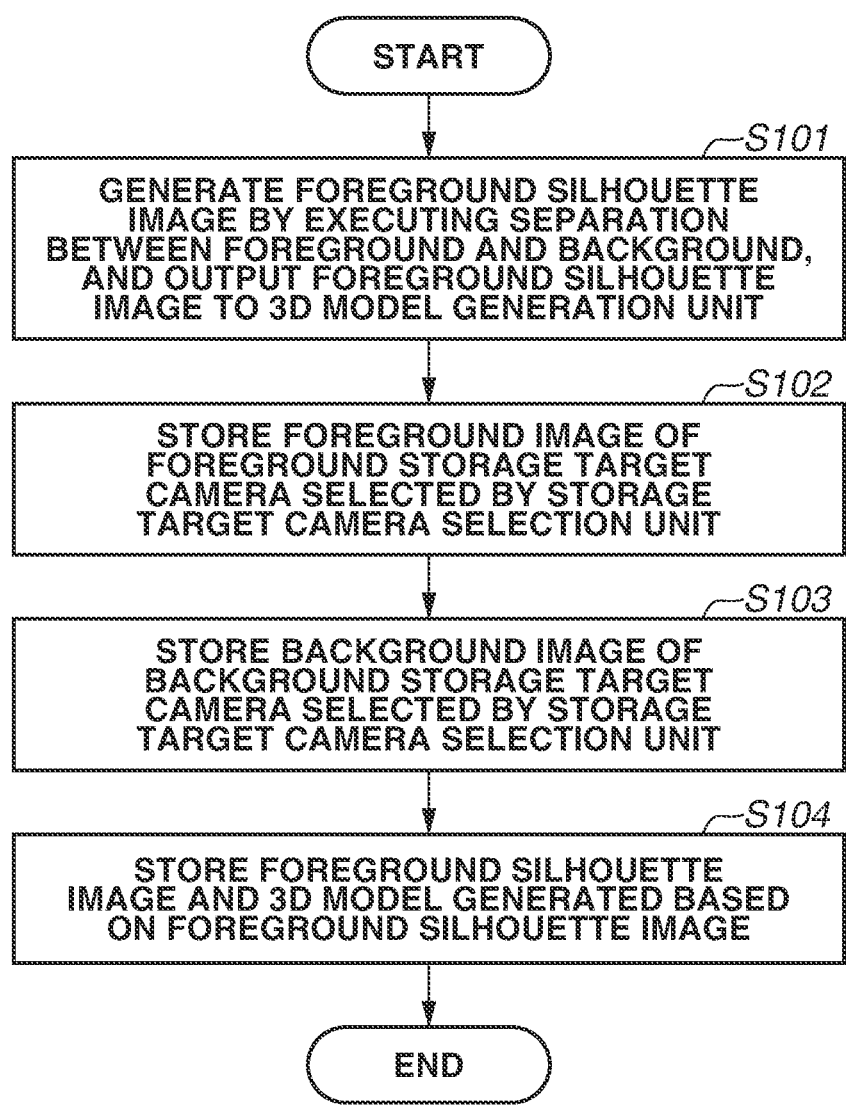
FIG. 3 is a flowchart illustrating an example of processing by the material generation apparatus.

Next, an example of processing by the material generation apparatus 10 will be described with reference to a flowchart in FIG. 3. The flowchart in FIG. 3 is implemented by the CPU 1311 of the material generation apparatus 10 when the CPU 1311 executes a program stored in a nonvolatile memory.

In step S101, the foreground background separation unit 102 generates the foreground image, the background image, and the foreground silhouette image by separating the foreground and the background based on the camera image, and outputs the foreground silhouette image to the 3D model generation unit 103.

In step S102, the foreground background separation unit 102 outputs the foreground image generated from the camera image of the foreground storage target camera selected by the storage target camera selection unit 101, to the data storage unit 104. The data storage unit 104 stores the foreground image.

In step S103, the foreground background separation unit 102 outputs the background image generated from the camera image of the background storage target camera selected by the storage target camera selection unit 101, to the data storage unit 104. The data storage unit 104 stores the background image.

In step S104, the 3D model generation unit 103 generates the 3D model based on the foreground silhouette image, and outputs the 3D model and the foreground silhouette image to the data storage unit 104. The data storage unit 104 stores the 3D model and the foreground silhouette image.

In this way, the data storage unit 104 stores the foreground images and the background images obtained from the images captured by the cameras selected from among the plurality of cameras, instead of storing all the foreground images and background images. Therefore, the data to be stored can be reduced, so that a disk access bandwidth can be made smaller. Moreover, since the storage target camera selection unit 101 selects cameras suitable for acquisition of the foreground image and the background image based on the camera-related information, it is possible to generate the material data appropriately, while avoiding an increase in processing load.

Further, the 3D model generation unit 103 generates the 3D model from the camera images of more cameras than the foreground storage target cameras (all cameras in the present exemplary embodiment), so that the 3D model can be generated with higher accuracy. The 3D model may be generated based on only the foreground silhouette image generated from the camera image of the foreground storage target camera.

The 3D model generation unit 103 may generate visibility determination information beforehand by determining whether the output point group data is visible from each of the cameras, and the data storage unit 104 may store the visibility determination information. The visibility determination information is stored and used for generating the virtual viewpoint image, so that the virtual viewpoint image can be generated at high speed.

Here, there will be described a method for determining whether each point of the point group data generated by the 3D model generation unit 103 is visible from each of the cameras to be used for foreground processing. The 3D model generation unit 103 three-dimensionally projects a point included in the 3D model in each of the camera images or the foreground silhouette image, and determines that the point is visible in a case where the point overlaps a pixel indicating the foreground pixel. In a case where the virtual viewpoint image is to be generated, the 3D model generation unit 103 renders the 3D model from a virtual viewpoint designated by a user. Specifically, the 3D model generation unit 103 adds color to the foreground image. To render the 3D model from the virtual viewpoint, the 3D model generation unit 103 selects a camera for capturing the foreground image for coloring, based on the visibility determination information indicating whether the 3D model is visible from the camera, the virtual viewpoint, and the position as well as the direction of the camera. In the present exemplary embodiment, thus, in a case where the 3D model generation unit 103 performs the visibility determination, only the foreground storage target camera is subjected to the visibility determination. As a result, a processing load for the visibility determination can be reduced, and data to be stored can be also reduced in storing the visibility determination information.

Further, in the present exemplary embodiment, the case where the storage target camera selection unit 101 determines and selects the camera is described, but this is not limitative. For example, the foreground storage target camera, the background storage target camera, and the camera for generating the 3D model may be set beforehand when the above-described image-capturing system and the material generation apparatus 10 are configured, and the storage target camera selection unit 101 may select a camera based on the information set beforehand.

Furthermore, in the present exemplary embodiment, the case where the foreground silhouette image is used to generate the 3D model is described, but this is not limitative. For example, a model may be separately generated by using a depth camera that measures a distance, and coloring may be performed by using the foreground image captured by the above-described foreground storage target camera.

Next, a material generation apparatus 20 according to a second exemplary embodiment will be described.

In general, in a case where a 3D model is to be generated, a processing load increases as the number of cameras increases. In the above-described volume intersection method, the processing for determining whether the foreground appears in each of the cameras is performed and therefore, the load of this determination processing increases in proportion to the number of cameras. Meanwhile, if the number of cameras is too small, a range not captured by a camera increases when a 3D model is generated, so that the 3D model is generated in a different form with respect to an object that actually exists. This reduces the quality of the 3D model.

Further, there is a case where an object with higher resolution is generated by using some of the cameras in the image-capturing system, each of which is mounted with a lens having a long focal length in order to increase the image resolution of an object that appears as a foreground. In this case, each of these cameras has a narrow image-capturing range. Generation of a 3D model includes processing for projecting a certain point on a camera image of a camera based on three-dimensional calculation. Use of such a camera having a narrow image-capturing range increases the number of cases where it is determined that the point does not appear as a result of calculation, so that a processing load is increased. The material generation apparatus 20 according to the present exemplary embodiment reduces a processing load in generating a 3D model by selecting a camera for performing image-capturing for generation of the 3D model, from a plurality of cameras.

Figure 4:
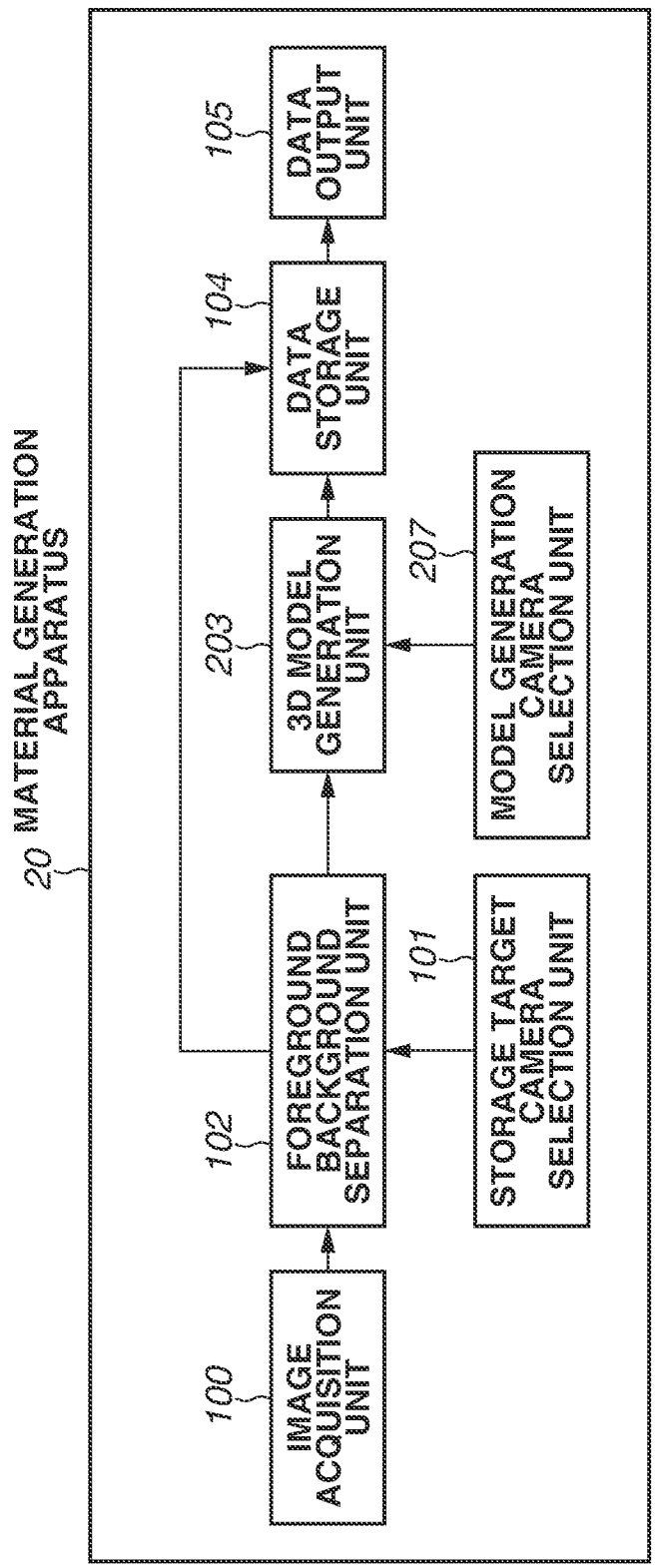
FIG. 4 is a diagram illustrating an example of a configuration of a material generation apparatus according to one or more aspects of the present disclosure.

FIG. 4 is a diagram illustrating an example of a configuration of the material generation apparatus 20. A configuration similar to that of the first exemplary embodiment is provided with the same reference numeral as that of the first exemplary embodiment and will not be described.

A 3D model generation unit 203 generates a 3D model, using a camera image of a camera selected by a model generation camera selection unit 207. In the following, the camera selected by the model generation camera selection unit 207 will be referred to as "3D model generation target camera".

In the volume intersection method, in determination of whether the rectangular solid is to be used for forming a 3D model, a point such as a representative point of the rectangular solid is projected onto a foreground silhouette image of each of the cameras based on three-dimensional calculation. In the present exemplary embodiment, only the 3D model generation target camera is subjected to projection processing. Therefore, the processing of projection on the foreground silhouette image and the processing for determining the rectangular solid for forming a 3D model can be reduced, so that the processing load in generating the 3D model can be reduced.

The model generation camera selection unit 207 selects a camera to be used for the processing for generating the 3D model based on camera-related information set beforehand.

Here, a method for selection of a camera by the model generation camera selection unit 207 will be described.

In a case where cameras are disposed in an oval shape to capture images of a target space as in the image-capturing system of the first exemplary embodiment, the model generation camera selection unit 207 does not select cameras having close positions and orientations from each other from among the plurality of cameras. In other words, the model generation camera selection unit 207 selects a camera, based on the position and the orientation of the camera.

Further, in consideration of reducing the processing load for generating the 3D model, the model generation camera selection unit 207 may evaluate an image-capturing range based on information indicating a focal length and a distance to image-capturing target, and select a camera having a wide image-capturing range. For example, the model generation camera selection unit 207 can select a camera having an image-capturing range wider than that of the foreground storage target camera. Furthermore, the model generation camera selection unit 207 may select a camera based on information similar to that of the first exemplary embodiment.

The method for selection of a camera by the model generation camera selection unit 207 is not limited to the above-described example. The camera may be selected by using the above-described method alone, or in combination with other method. For example, the model generation camera selection unit 207 may select a camera based on only information indicating an image-capturing range.

Next, an example of processing by the material generation apparatus 20 will be described with reference to the flowchart in FIG. 3. A difference from the first exemplary embodiment is processing in step S104 and therefore the processing in step S104 will be described.

In step S104, the 3D model generation unit 203 generates the 3D model from the camera image captured by the 3D model generation target camera selected by the model generation camera selection unit 207. In other words, in the present exemplary embodiment, the 3D model generation unit 203 stores a silhouette image generated from the camera image captured by the 3D model generation target camera, and the 3D model generated from this silhouette image in step S104.

In this way, the 3D model generation unit 203 can reduce the processing load in generating the 3D model, by generating the 3D model from the image captured by the camera selected by the model generation camera selection unit 207. In other words, the 3D model generation unit 203 can reduce the processing load in generating the 3D model, by omitting processing such as processing for an image captured by a camera not selected by the model generation camera selection unit 207. Further, the model generation camera selection unit 207 can avoid a reduction in the quality of the 3D model by selecting a camera suitable for generation of the 3D model based on information such as the camera-related information.

The foreground storage target camera and the background storage target camera described in the first exemplary embodiment, and the 3D model generation target camera described in the present exemplary embodiment may be selected independently, or selected in a duplicated manner.

Next, an image processing system 1 according to a third exemplary embodiment will be described. The image processing system 1 has image processing apparatuses 30 connected to a plurality of cameras, and a material generation apparatus 40 that generates material data for a virtual viewpoint image using a camera image output from the image processing apparatus 30.

The image processing apparatus 30 according to the present exemplary embodiment separates a foreground and a background based on the camera image and transmits only a region extracted as the foreground to the material generation apparatus 40, so that a transmission amount is reduced. Further, the material generation apparatus 40 according to the present exemplary embodiment selects a camera for capturing a foreground image to be stored as the material data and a camera for capturing a background image to be stored as the material data, and transmits the foreground image or the background image depending on the image processing apparatuses 30, so that a transmission amount is reduced.

Figure 5:
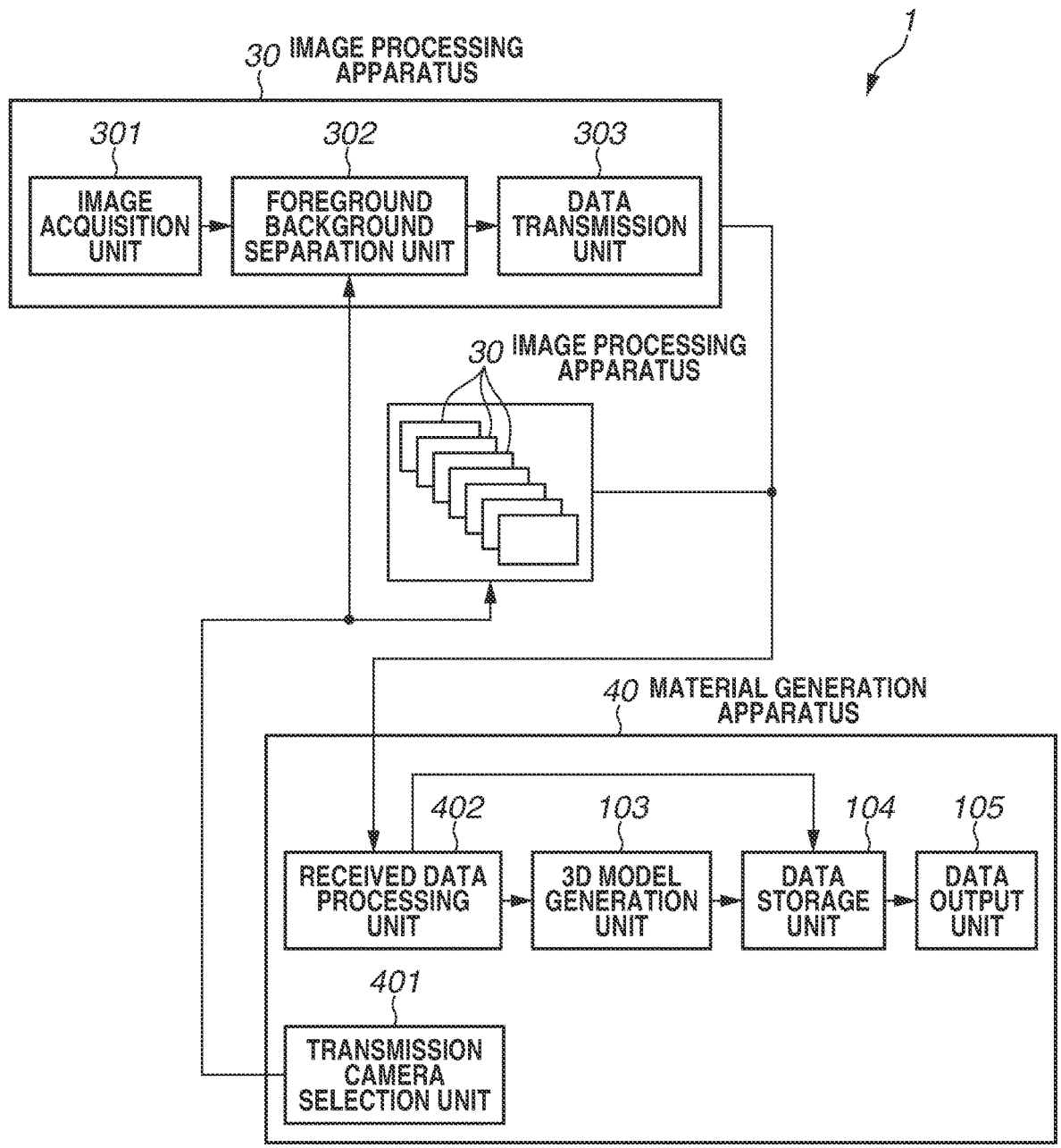
FIG. 5 is a diagram illustrating an example of a configuration of an image processing system according to one or more aspects of the present disclosure.

FIG. 5 is a diagram illustrating an example of a configuration of the image processing system 1 having the image processing apparatus 30 and the material generation apparatus 40. A configuration similar to that of the first exemplary embodiment is provided with the same reference numeral as that of the first exemplary embodiment and will not be described. The configuration of each of the apparatuses is implemented by a CPU of each of the apparatuses when the CPU executes a program stored in a nonvolatile memory.

The image processing system 1 comprises a plurality of image processing apparatuses 30 which are connected to the respective cameras of the image-capturing system. Therefore, in the image processing system 1, the number of the image processing apparatuses 30 and the number of the cameras are equal. The image processing apparatus 30 processes a camera image and transmits various data to the material generation apparatus 40.

The image processing apparatus 30 has an image acquisition unit 301, a foreground background separation unit 302, and a data transmission unit 303.

The image acquisition unit 301 acquires a camera image from one camera. The image acquisition unit 301 outputs the acquired camera image to the foreground background separation unit 302.

The foreground background separation unit 302 generates a background image, a foreground image clipped out in a rectangular shape, and a foreground silhouette image from the camera image. This processing is similar to that of the foreground background separation unit 102 according to the first exemplary embodiment. The foreground background separation unit 302 outputs the foreground silhouette image to the data transmission unit 303.

Here, the foreground background separation unit 302 receives identification information of the camera for capturing the foreground image to be stored as the material data and identification information of the camera for capturing the background image to be stored as the material data from a transmission camera selection unit 401 of the material generation apparatus 40. In the present exemplary embodiment, the camera for capturing the foreground image to be stored as the material data will be referred to as a "foreground transmission target camera", and the camera for capturing the background image to be stored as the material data will be referred to as a "background transmission target camera". Further, the identification information is information for uniquely identifying a camera, and, for example, a camera ID in the image-capturing system can be used.

The foreground background separation unit 302 outputs the generated foreground image to the data transmission unit 303 in a case where the received identification information of the foreground transmission target camera matches with the identification information of the connected camera. Further, the foreground background separation unit 302 outputs the generated background image to the data transmission unit 303, in a case where the received identification information of the background transmission target camera matches the identification information of the connected camera. There is a case where both of the foreground image and the background image are output, depending on a selection method of the transmission camera selection unit 401.

The data transmission unit 303 transmits the data output from the foreground background separation unit 302, to the material generation apparatus 40. The data transmission unit 303 may each be connected to the material generation apparatus 40 by, for example, a local area network (LAN) cable. The data transmission unit 303 transmits the data as transmission control protocol (TCP) packet data that is defined by Transmission Control Protocol/Internet Protocol (TCP/IP), by using a network. However, a physical cable and a protocol to be used for the transmission are not limited, and, for example, a serial digital interface may be used. Further, the data transmission unit 303 may transmit the data by wireless communication such as Wireless Fidelity (Wi-Fi) defined by the Institute of Electrical and Electronics Engineers (IEEE) 802.11 standard.

The material generation apparatus 40 has the transmission camera selection unit 401, a received data processing unit 402, the 3D model generation unit 103, the data storage unit 104, and the data output unit 105.

The transmission camera selection unit 401 selects the foreground transmission target camera and the background transmission target camera, from the cameras of the image-capturing system. The transmission camera selection unit 401 transmits the identification information of the foreground transmission target camera and the identification information of the background transmission target camera to each of the image processing apparatuses 30.

In the present exemplary embodiment, the transmission camera selection unit 401 can select a camera based on information similar to that of the first exemplary embodiment.

The received data processing unit 402 receives the foreground image, the background image, and the foreground silhouette image from each of the image processing apparatuses 30. The received data processing unit 402 outputs the foreground image and the background image to the data storage unit 104. The data storage unit 104 stores the foreground image and the background image output from the received data processing unit 402. Further, the received data processing unit 402 outputs the foreground silhouette image to the 3D model generation unit 103. The 3D model generation unit 103 generates a 3D model based on the foreground silhouette image output from the received data processing unit 402.

In this way, the data transmission unit 303 of the image processing apparatus 30 transmits the foreground image and the background image generated from the images captured by the cameras selected by the transmission camera selection unit 401. Therefore, it is possible to reduce a data transmission amount in the image processing system 1 as a whole. The transmission camera selection unit 401 selects cameras suitable for capturing of the foreground image and the background image based on camera-related information, so that the data transmission unit 303 can transmit more effective data.

Next, an image processing system 2 according to a fourth exemplary embodiment will be described.

In the present exemplary embodiment, camera information of each of a foreground storage target camera, a background storage target camera, and a 3D model generation target camera is stored, and when a virtual viewpoint image is generated, the camera information of a camera used for each process is added as metadata. A user who views the virtual viewpoint image can estimate the quality of the virtual viewpoint image by confirming the camera information used for each process. For example, when a 3D model is generated using images of more cameras, the 3D model has higher accuracy. Therefore, the user can estimate that image quality of an virtual viewpoint image generated using the 3D model is high. This makes it easy for the user to search for desired data by referring to the camera information.

Figure 6:
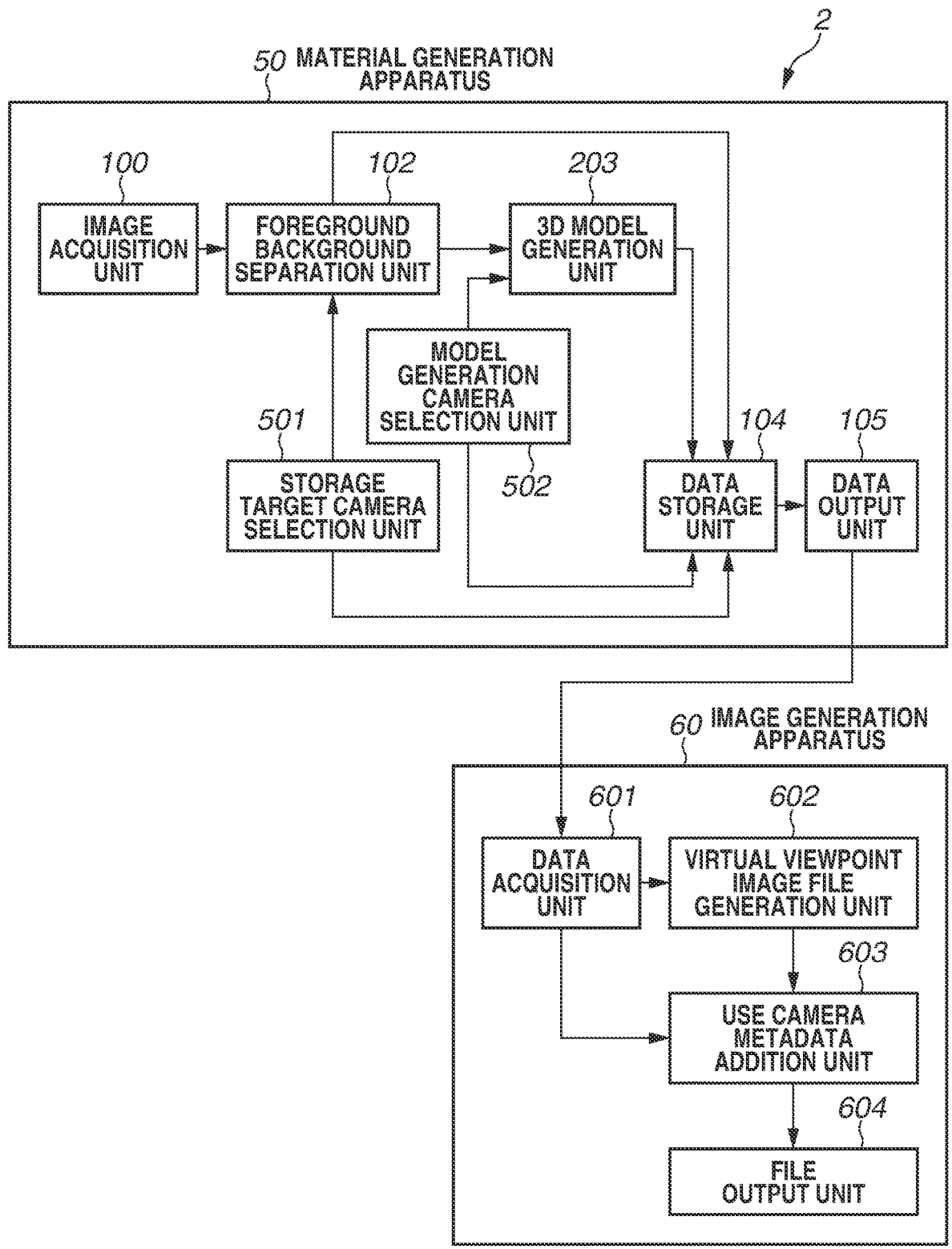
FIG. 6 is a diagram illustrating an example of a configuration of an image processing system according to one or more aspects of the present disclosure.

FIG. 6 is a diagram illustrating an example of a configuration of the image processing system 2 having a material generation apparatus 50 and an image generation apparatus 60. A configuration similar to that of the first exemplary embodiment or the second exemplary embodiment is provided with the same reference numeral as that of the corresponding exemplary embodiment, and will not be described. A CPU of each of the apparatuses executes a program stored in a nonvolatile memory, so that the configuration of each of the apparatuses is implemented.

The material generation apparatus 50 has the image acquisition unit 100, the foreground background separation unit 102, the data storage unit 104, the data output unit 105, the 3D model generation unit 203, a storage target camera selection unit 501, and a model generation camera selection unit 502.

The storage target camera selection unit 501 has a function similar to that of the storage target camera selection unit 101 of the first exemplary embodiment, and further, outputs the camera information of the foreground storage target camera and the camera information of the background storage target camera to the data storage unit 104. The data storage unit 104 stores the camera information output from the storage target camera selection unit 501. In this case, the data storage unit 104 stores a foreground image output from the foreground storage target camera and the camera information of the foreground storage target camera in association with each other, and stores a background image output from the background storage target camera and the camera information of the background storage target camera in association with each other.

The model generation camera selection unit 502 has a function similar to that of the model generation camera selection unit 207 according to the second exemplary embodiment, and further, outputs the camera information of the 3D model generation target camera to the data storage unit 104. The data storage unit 104 stores the camera information output from the model generation camera selection unit 502. In this case, the data storage unit 104 stores a 3D model output from the 3D model generation target camera and the camera information of the 3D model generation target camera in correspondence with each other.

Here, the camera information includes information about lens performance and sensor information, in addition to the camera-related information described above.

The image generation apparatus 60 has a data acquisition unit 601, a virtual viewpoint image file generation unit 602, a use camera metadata addition unit 603, and a file output unit 604.

The data acquisition unit 601 acquires material data for a virtual viewpoint image from the material generation apparatus 50, and outputs the acquired material data to the virtual viewpoint image file generation unit 602. Further, the data acquisition unit 601 acquires the camera information of each of the foreground storage target camera, the background storage target camera, and the 3D model generation target camera which is associated with the material data from the material generation apparatus 50, and outputs the acquired camera information to the use camera metadata addition unit 603. In a case where the data acquisition unit 601 acquires the material data, the data acquisition unit 601 requests the data output unit 105 time information and data type associated with the material data. Here, the data acquisition unit 601 designates for example, a date, a time (hour, minute, second), and a frame as the time information. The data acquisition unit 601 also designates the foreground image, the background image, and the 3D model, as the data type. The data acquisition unit 601 thus can acquire the foreground image, the background image, and the 3D model of a certain frame, and the virtual viewpoint image file generation unit 602 can generate the virtual viewpoint image in that frame.

The virtual viewpoint image file generation unit 602 generates the virtual viewpoint image based on the input virtual viewpoint information and generates a moving image file based on the generated virtual viewpoint image. The virtual viewpoint image file generation unit 602 outputs the generated moving image file to the use camera metadata addition unit 603. The virtual viewpoint information includes at least information about the position and the direction of a virtual viewpoint. A user or operator inputs the virtual viewpoint information, using a user interface (UI) (not illustrated). Alternatively, the virtual viewpoint information may be automatically set by the image generation apparatus 60.

Here, an example of a method for generating the virtual viewpoint image will be described.

The virtual viewpoint image file generation unit 602 projects a point included in the 3D model viewed from the input virtual viewpoint on the virtual viewpoint image. The projected point is colored by using the foreground image of a camera at an angle close to the virtual viewpoint. The foreground image viewed from the virtual viewpoint can be thereby generated. Further, using a model for background, the virtual viewpoint image file generation unit 602 projects the 3D model on the virtual viewpoint image, and thereby generates the background image viewed from the virtual viewpoint. The virtual viewpoint image file generation unit 602 generates the virtual viewpoint image in which the background image and the foreground image are combined.

Next, an example of a method for generating the moving image file will be described.

First, the virtual viewpoint image file generation unit 602 performs moving-image compression based on the virtual viewpoint image, based on the H.265 standard (ISO/IEC 23008-2 HEVC). Further, the virtual viewpoint image file generation unit 602 generates the moving image file as an mp4 file in MPEG-4 Part 14 format specified in ISO/ICE 1 4496-14: 2003, ISO/ICE JTC1.

The use camera metadata addition unit 603 adds "each process use camera information" including the camera information about the camera used for each process, as the metadata of the file. A method for the addition in each standard will be described below.

The file output unit 604 outputs the generated moving image file.

Figure 7:
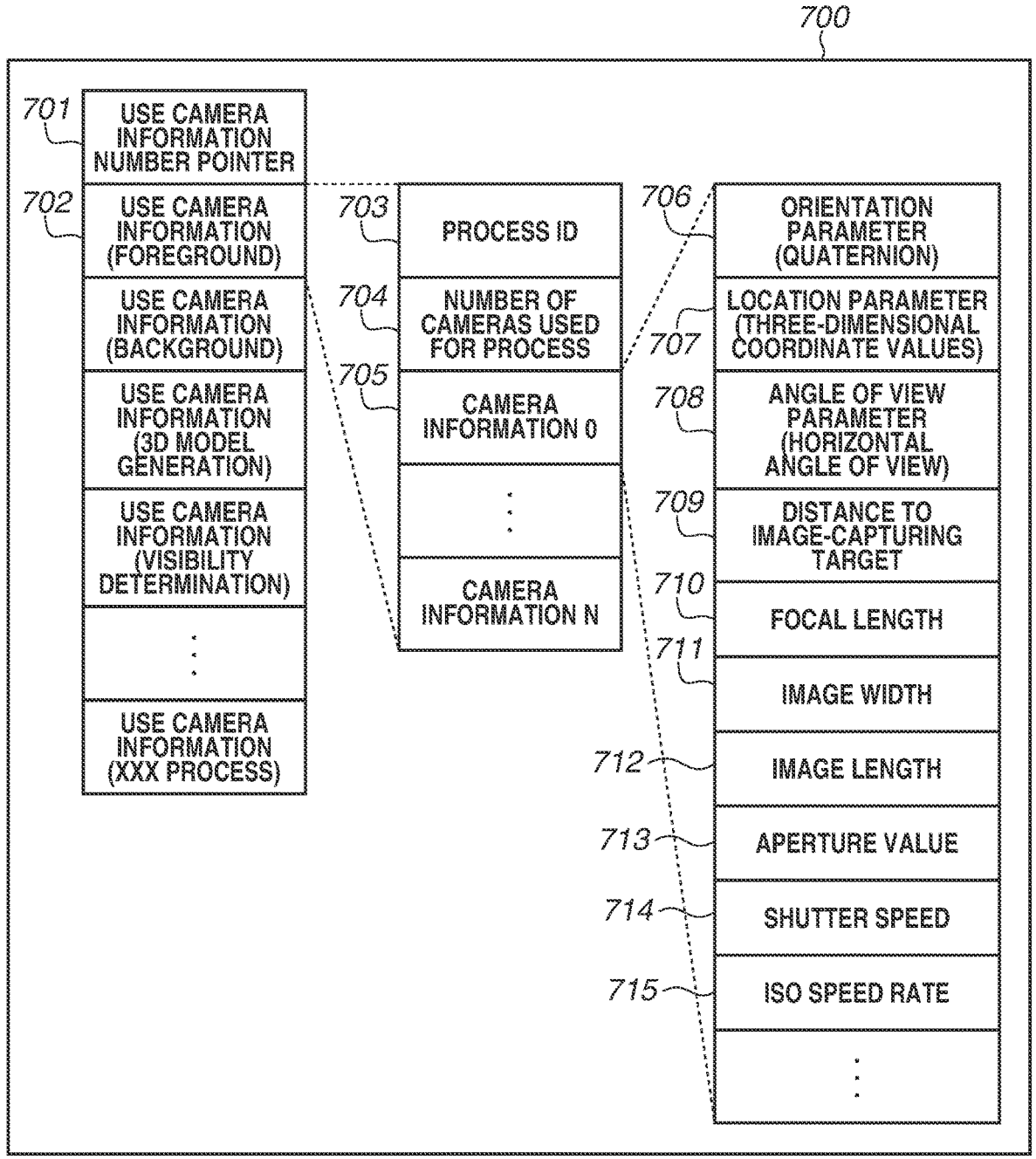
FIG. 7 is a diagram illustrating an example of each process use camera information.

FIG. 7 is a diagram illustrating an example of each process use camera information 700.

In the each process use camera information 700, a pointer 701 to the number of pieces of information about used cameras ("use camera information number") and information about each used camera ("use camera information") is provided at the top, and pieces of use camera information 702 for the respective processes are arranged following this pointer. The use camera information 702 includes pieces of camera information about all the cameras used in generating the foreground image as the material data.

The use camera information 702 includes a process ID 703, a number of cameras used for process 704, and camera information 705. The camera information 705 is information about one camera, and includes at least one of the following pieces of information. The pieces of information include an orientation parameter 706, a location parameter 707, an angle of view parameter 708, a distance to image-capturing target 709, a focal length 710, an image width 711, an image length 712, an aperture value 713, a shutter speed 714, and an ISO sensitivity (a speed rate) 715.

The orientation parameter 706 is expressed in quaternion that is expressed by, for example, the following expression (1).

$$Q=(0;x,y,z) \quad (1)$$

Here, the left portion of a semicolon is a real part, and, x, y, z represent an imaginary part.

Suppose the location parameter 707 represents coordinates (x, y, z) in a three-dimensional coordinate system in which the origin in world coordinates is (0, 0, 0).

Suppose the angle of view parameter 708 is a horizontal angle of view of the virtual viewpoint. Representation for the horizontal angle of view is not limited. For example, the horizontal angle of view may be expressed as an angle in a range of 0 degree to 180 degrees, and may be expressed as a focal length in a case where the standard is 50 mm in a 35-mm film camera.

Further, the camera information may also include information such as a color temperature, a focal length of a lens, a lens model number, and a camera model number. The camera information is not limited to the above-described information.

Next, an example of a method for addition of the metadata in each standard will be described.

Here, a method for addition of metadata in the case of the Camera and Imaging Products Association standard DC-008-2012, Image File Format for Digital Still Cameras: Exif 2.3, will be described.

Figure 8A:
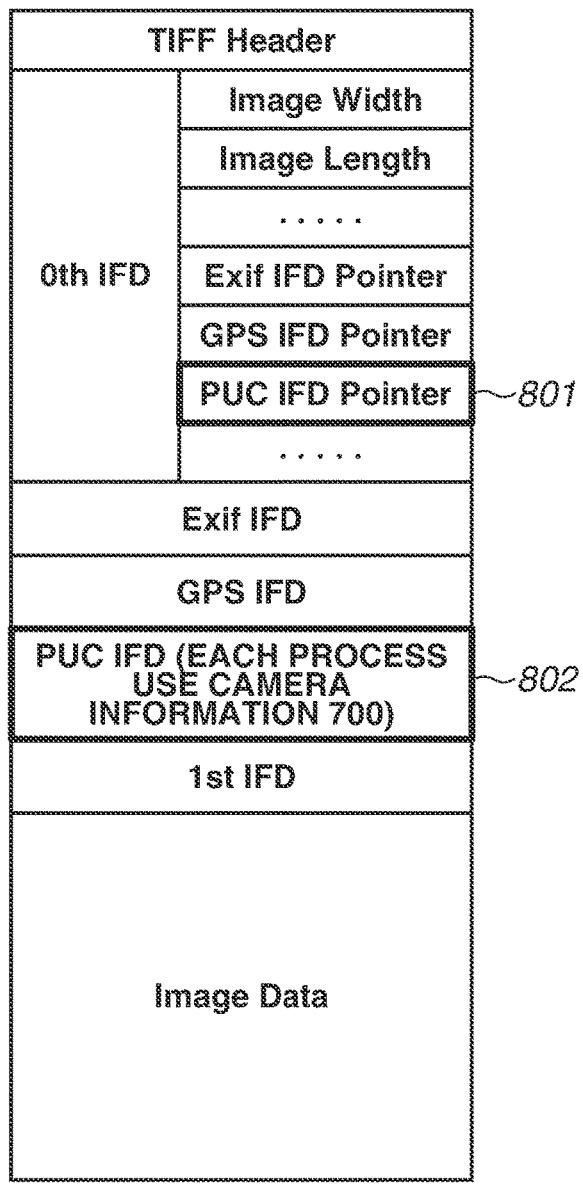
FIGS. 8A and 8B each illustrate an example of addition of the each process use camera information.

FIG. 8A is a diagram illustrating an example in a case where the each process use camera information 700 is added to a format specified in the Exif standard.

In FIG. 8A, a processing using camera image file directory (hereinafter referred to as "PUC IFD") 802 is defined, and the each process use camera information 700 is stored therein. A PUC IFD pointer 801 is a pointer indicating the PUC IFD 802.

FIG. 9 is a diagram illustrating an example of tag information of a PUC IFD.

A PUC tag version is a value beginning with 1 and representing the version of the format of the subsequent data.

An orientation parameter is expressed in quaternion, and the value of each of the real part and the imaginary part described above is expressed as a signed integer of 4 bytes.

A location parameter is a parameter in which the value of each of coordinates x, y, and z from the origin is expressed as a signed floating point number of 4 bytes.

An angle of view parameter represents a horizontal angle of view, and is expressed as a signed floating point number of 4 bytes.

A distance to an image-capturing target indicates a distance expressed in millimeters, and is expressed as an unsigned integer of 4 bytes.

A focal length is expressed in millimeters, and expressed as a fraction of an unsigned integer of 4 bytes. The first one is a numerator, and the second one is a denominator.

An image width indicates the width of a captured image of a camera, and is expressed as a signed integer of 4 bytes.

An image length is the length of a captured image of the camera, and is expressed as an unsigned integer of 4 bytes.

An aperture value indicates an aperture value as an image-capturing parameter of the camera, and is expressed as a fraction of an unsigned integer of 4 bytes. The first one is a numerator, and the second one is a denominator.

A shutter speed indicates a shutter speed as an image-capturing parameter of the camera, and is expressed as a fraction of a signed integer of 4 bytes. The first one is a numerator, and the second one is a denominator.

An ISO sensitivity (a speed rate) indicates an ISO sensitivity as an image-capturing parameter of the camera, and is expressed as an unsigned integer of 2 bytes. The order of the above-described pieces of information and the data lengths thereof are not limited. Further, the above-described pieces of information may be partially included.

Figure 8B:
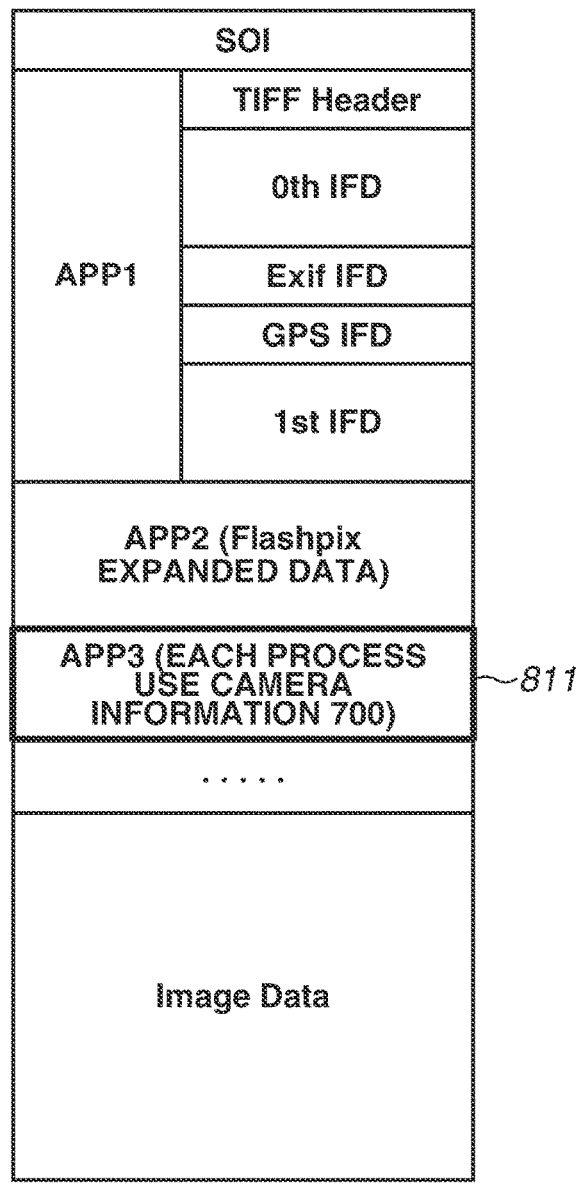

FIG. 8B is a diagram illustrating an example in a case where, although not being defined in the Exif standard, the each process use camera information 700 is stored by using APP 3 (811) that is an undefined APPn marker that can be freely used by a vendor or industry group.

In this way, a region for storing the each process use camera information 700 is added to and defined in the format specified in the Exif standard which is an existing still image format, so that the virtual viewpoint image with the virtual viewpoint parameters can be generated.

Next, a method for addition of metadata in the case of the ISO/IEC 14496-12 (MPEG-4 Part 12) ISO base media file format (hereinafter referred to as "ISO BMFF") standard will be described.

Figure 10A:
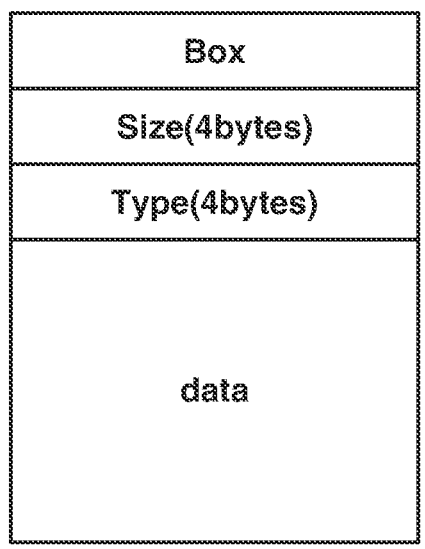
FIGS. 10A and 10B each illustrate an example of a structure of a box specified in International Organization for Standardization base media file format (ISO BMFF).
Figure 10B:
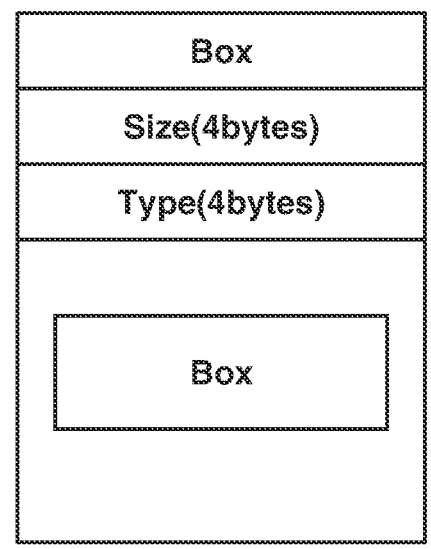

The ISO BMFF handles a file by the unit called "box" that stores information indicating a size and a type as well as data. FIG. 10A is a diagram illustrating an example of a structure of the box. It is also possible to adopt a structure in which a box includes a box as data, as illustrated in FIG. 10B.

Figure 11:
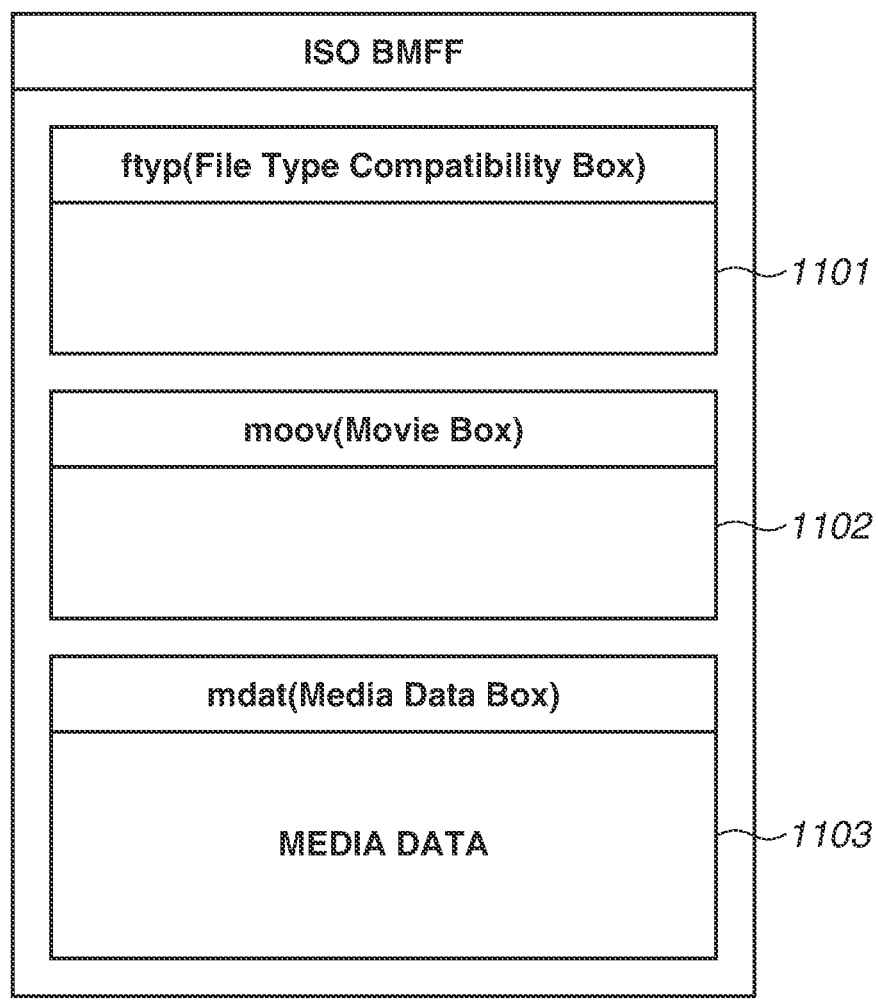
FIG. 11 is a diagram illustrating an example of a structure of an ISO BMFF file.

FIG. 11 is a diagram illustrating an example of a data structure of an ISO BMFF file.

The ISO BMFF file includes a file type compatibility box (ftyp box) 1101, a movie box (moov box) 1102, and a media data box (mdat box) 1103. File format information, e.g., information indicating that the file is an ISO BMFF file, a box version, and a manufacturer that has created the file, is recorded in the ftyp box 1101.

The moov box 1102 includes metadata such as a temporal axis for managing media data and an address. The mdat box 1103 includes media data to be actually reproduced as a moving image.

FIGS. 12A and 12B each illustrate an example of addition of the each process use camera information 700 to the moov box 1102. As illustrated in FIG. 12A, the each process use camera information 700 can be added to a meta box 1201 indicating meta information of the entire file. In the case of a moving image file in which images varying among tracks are connected and edited, the each process use camera information 700 can be added to a meta box 1202 of each of the tracks, as illustrated in FIG. 12B.

For example, in the following box,

```
aligned(8) class MetaBox (handler_type)
    extends FullBox('meta', version = 0, 0) {
    HandlerBox(handler_type) theHandler;
    PrimaryItemBox primary_resource; // optional
    DataInformationBox file_locations; // optional
    ItemLocationBox item_locations; // optional
    ItemProtectionBox protections; // optional
    ItemInfoBox item_infos; // optional
    IPMPControlBox IPMP_control; // optional
    ItemReferenceBox item_refs; // optional
    ItemDataBox item_data; // optional
    Virtual_ViewPoint_Camera_Info // optional
    Box other_boxes[ ]; // optional
}
Virtual_ViewPoint_Camera_Info represents the each
process use camera information 700.
```

This box is defined as follows.

Box Type: 'vvci'
Container: Meta box ('meta')
Mandatory: No
Quantity: Zero or one
The syntax thereof is defined as follows.
aligned(8) class ItemLocationBox extends FullBox('vvci',version,0) {

```
unsigned int(32) offset_size;
unsigned int(32) length_size;
unsigned int(32) base_offset_size;
if (version == 1) {
    unsigned int(32) index_size;
} else {
    unsigned int(32) reserved;
}
for (i=0, i<4; i++) {
    int(32) Rotation Quaternion[i]; // orientation parameter
}
for (i=0, i<3; i++) {
    float(32) Translation_Vector[i]; // location parameter
}
float(32) Horizontal_Angle; // angle of view parameter
unsigned int(32) Distance_to_Target; // distance to an
image-capturing target
unsigned int(32) Focal_Length_Numerator // focal length numerator
unsigned int(32) Focal_Length_Denominator // focal length denominator
unsigned int(32) Image_Width; // image width
unsigned int(32) Image_Length; // image length
unsigned int(32) Aperture_Value_Numerator // aperture value numerator
unsigned int(32) Aperture_Value_Denominator // aperture
value denominator
int(32) Shutter_Speed_Numerator // shutter speed numerator
int(32) Shutter_Speed_Denominator // shutter speed denominator
short(16) ISO_Speed_Rating // ISO sensitivity
}
```

In this way, the data storage unit 104 of the material generation apparatus 50 stores the camera information of the camera used in each process in generating the material data for the virtual viewpoint image. The image generation apparatus 60 can add the camera information of the camera used for each process as the metadata of the file. Since the camera information of the camera used for each process is thus added to the file, the user can confirm the quality of the virtual viewpoint image based on the added camera information. For example, in a case where the user reproduces the moving image to which the camera information of the camera used for each process is added, the user can confirm the quality of the moving image by confirming the camera information added to the moving image by an image reproduction apparatus (not illustrated) in the property. Also in a case where the user searches for a file, the camera information can be used for a search condition, e.g., such a condition that there are thirty or more of cameras used for 3D model generation, so that the user can search for a moving image of high quality.

In the present exemplary embodiment, the case where the still image format is the Exif standard format and the ISO BMFF standard format is described, but this case is not limitative, and other standard or an original format may be adopted. Further, the value and the representation of each of the parameters are not limited to the above-described value and representation.

Other Exemplary Embodiments

The present disclosure is also implemented by executing the following processing. A program that implements the functions of each of the above-described exemplary embodiments is supplied to a system or apparatus via a network or any of various storage media, and a computer (a CPU or a micro processing unit (MPU)) of the system or apparatus reads out a program code and executes the read-out program code to perform control processing. In this case, the program and the storage medium storing the program are included in the scope of the present disclosure.

The present disclosure is described in detail above with reference to some exemplary embodiments, but the present disclosure is not limited to the above-described exemplary embodiments, and includes various forms within a range not departing from the gist of the present disclosure. Further, each of the above-described exemplary embodiments merely represents an exemplary embodiment of the present disclosure, and the exemplary embodiments can be combined as appropriate.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to generate material data appropriately, while avoiding an increase in processing load.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-022873, filed Feb. 12, 2019, which is hereby incorporated by reference herein in its entirety.

What is claimed is:

1. A generation system comprising:
one or more memories storing instructions; and
one or more processors executing the instructions to:
generate, based on an image captured by a first image capturing apparatus, a foreground image which includes a foreground object and is used for generation of a virtual viewpoint image corresponding to a designated virtual viewpoint,
generate, based on an image captured by a second image capturing apparatus different from the first image capturing apparatus, a background image which does not include the foreground object and is used for generation of the virtual viewpoint image corresponding to the designated virtual viewpoint, and
control to output the generated foreground image corresponding to the first image capturing apparatus and the generated background image corresponding to the second image capturing apparatus, and not to output a foreground image which includes the foreground object and which corresponds to the second image capturing apparatus.

2. The system according to claim 1,
wherein the one or more processors further execute the instructions to select the first image capturing apparatus from among a plurality of image capturing apparatuses.

3. The system according to claim 2,
wherein the first image capturing apparatus is selected based on information representing a position of each of the plurality of image capturing apparatuses.

4. The system according to claim 3,
wherein every two or more image capturing apparatuses from the plurality of image capturing apparatuses is selected as the first image capturing apparatus, based on the information.

5. The system according to claim 1,
wherein the second image capturing apparatus is selected from among a plurality of image capturing apparatuses.

6. The system according to claim 5,
wherein the second image capturing apparatus is selected based on information representing a focal length or information representing a distance to an image-capturing target of each of the plurality of image capturing apparatuses.

7. The system according to claim 1,
wherein a focal length of the second image capturing apparatus is shorter than a focal length of the first image capturing apparatus, or a distance to an image-capturing target from the second image capturing apparatus is longer than a distance to an image-capturing target from the first image capturing apparatus.

8. The system according to claim 1,
wherein the one or more processors further execute the instructions to:
generate three-dimensional shape data of the foreground object based on the generated foreground image corresponding to the first image capturing apparatus; and
determine whether an element included in the generated three-dimensional shape data of the foreground object is visible from the first image capturing apparatus.

9. The system according to claim 1,
wherein the one or more processors further execute the instructions to:
select a third image capturing apparatus from the plurality of image capturing apparatuses; and
generate three-dimensional shape data of the foreground object based on an image captured by the third image capturing apparatus.

10. The system according to claim 9,
wherein the third image capturing apparatus is selected based on information representing an image-capturing range of each of the plurality of image capturing apparatuses.

11. The system according to claim 10,
wherein a wider image-capturing range of the third image capturing apparatus is wider than an image-capturing range of the first image capturing apparatus.

12. A method for generating data, the method comprising:
generating, based on an image selected from among the captured images, a foreground image which includes a foreground object and used for generation of a virtual viewpoint image corresponding to a designated virtual viewpoint, generating, based on an image captured by a second image capturing apparatus different from the first image capturing apparatus, a background image which does not include the foreground object and is used for generation of the virtual viewpoint image corresponding to the designated virtual viewpoint, and controlling to output the generated foreground image corresponding to the first image capturing apparatus and the generated background image corresponding to the second image capturing apparatus, and not to output a foreground image which includes the foreground object and which corresponds to the second image capturing apparatus.

13. A non-transitory computer-readable storage medium storing a program for causing a computer to execute a method for generating data, the method comprising:

generating, based on an image selected from among the captured images, a foreground image which includes a foreground object and used for generation of a virtual viewpoint image corresponding to a designated virtual viewpoint, generating, based on an image captured by a second image capturing apparatus different from the first image capturing apparatus, a background image which does not include the foreground object and is used for generation of the virtual viewpoint image corresponding to the designated virtual viewpoint, and controlling to output the generated foreground image corresponding to the first image capturing apparatus and the generated background image corresponding to the second image capturing apparatus, and not to output a foreground image which includes the foreground object and which corresponds to the second image capturing apparatus.

* * * * *